(12) United States Patent
Sugiyama et al.

(10) Patent No.: US 6,247,831 B1
(45) Date of Patent: Jun. 19, 2001

(54) VEHICLE LAMP WITH MULTIPLE-WALL SUPPORT STRUCTURE

(75) Inventors: Fumihiko Sugiyama; Kazuo Akiyama, both of Shizuoka (JP)

(73) Assignee: Koito Manufacturing Co. Ltd (JP)

( * ) Notice: Subject to any disclaimer, the term of this patent is extended or adjusted under 35 U.S.C. 154(b) by 0 days.

(21) Appl. No.: 09/383,090

(22) Filed: Aug. 25, 1999

(30) Foreign Application Priority Data

Sep. 11, 1998 (JP) .................................................. 10-258863

(51) Int. Cl.⁷ ...................................................... F21V 31/00
(52) U.S. Cl. ............................ 362/267; 362/549; 362/487
(58) Field of Search .................................... 362/459, 487, 362/549, 267, 96, 240, 544; 248/560, 580, 615, 634

(56) References Cited

U.S. PATENT DOCUMENTS

| | | | |
|---|---|---|---|
| 5,138,531 | 8/1992 | Daumueller et al. | 362/461 |
| 5,556,584 | 9/1996 | Yamazaki et al. | 264/465 |
| 5,560,706 | 10/1996 | Yamazaki et al. | 362/549 |
| 5,685,628 | 11/1997 | Feger et al. | 362/507 |
| 5,993,036 * | 11/1999 | Shimada et al. | 362/549 |

* cited by examiner

Primary Examiner—Thomas M. Sember
Assistant Examiner—Ismael Negron
(74) Attorney, Agent, or Firm—Fish & Richardson P.C.

(57) ABSTRACT

A vehicle lamp incorporating a lamp body having a wall structure formed on the rear surface. An elastic sealing member is applied to the leading edge of the wall structure. The wall structure is arranged to reduce a compressive load which has to be exerted on the elastic sealing member when the lamp is joined to the panel of a vehicle body. The wall structure prevents shifting of the elastic sealing member with respect to the wall structure. Portions of the wall structure in which the height of the wall is short are composed of double walls. Other portions each having a greater height are composed of single wall portions and include a plurality of ribs so that the elastic sealing member is stably held along the overall length of the wall structure.

16 Claims, 9 Drawing Sheets

| Sample | Compressibility | | | | |
|---|---|---|---|---|---|
| | 20% | 30% | 40% | 50% | 60% |
| 1 | Water introduced | No water Introduced | No water Introduced | No water Introduced | No water introduced |
| 2 | Water Introduced | Water introduced | No water Introduced | No water Introduced | No water Introduced |
| 3 | Water introduced | Water Introduced | Water introduced | No water Introduced | No water introduced |

*PRIOR ART*

VEHICLE LAMP WITH MULTIPLE-WALL SUPPORT STRUCTURE

BACKGROUND OF THE INVENTION

1. Field of the Invention

The present invention relates to a vehicle lamp, and more particularly, to a structure for sealing the space between a lamp body of the lamp and a panel of a vehicle body.

2. Prior Art

Hitherto, when a lamp is joined to a panel of a vehicle body, an elastic sealing member, such as a sheet packing, is interposed between the lamp and the panel of the vehicle body so as to provide a buffer and to maintain a seal.

Figure 12:
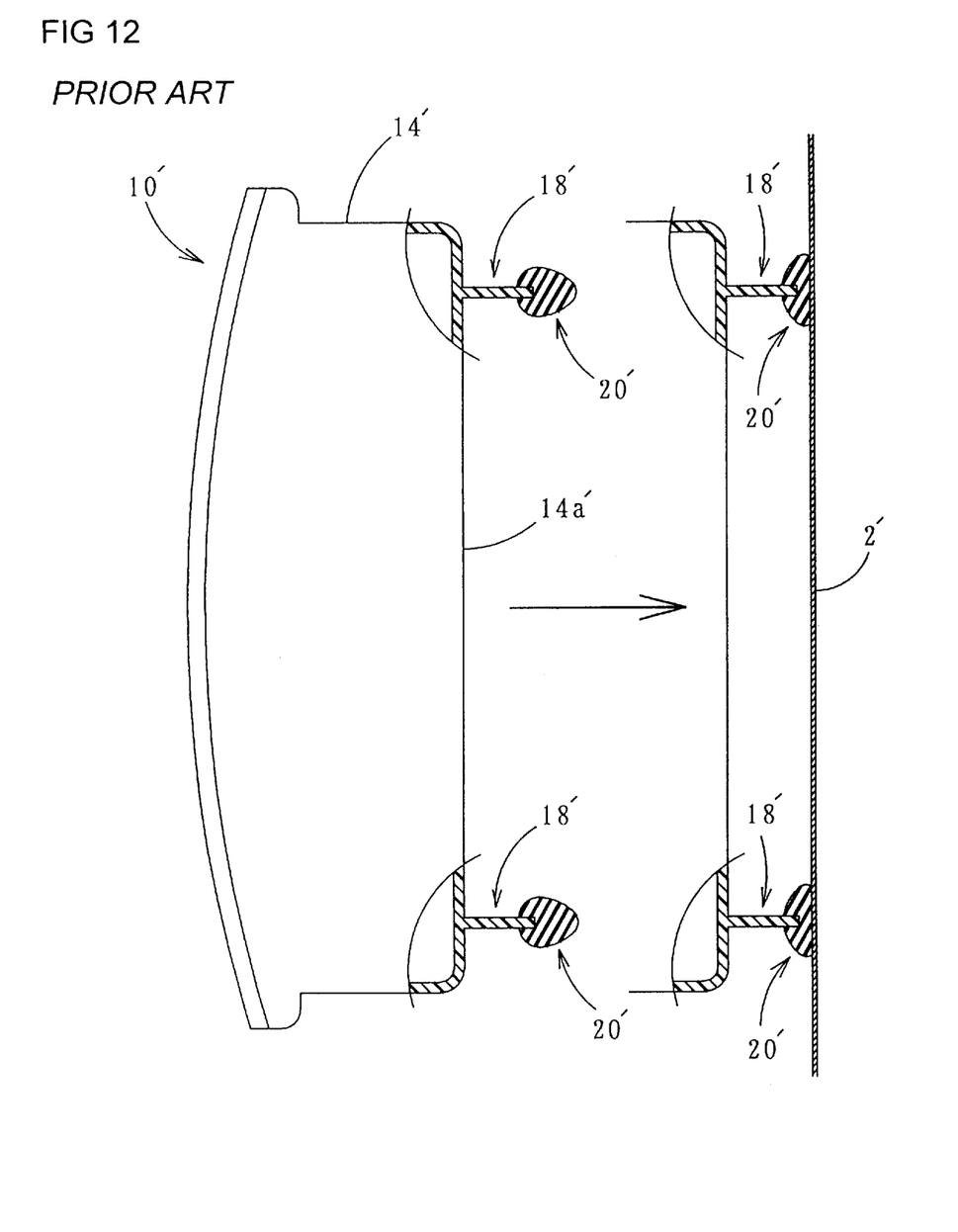
FIG. 12 is a diagram showing a conventional automobile lamp example for comparison to the portion of the invention shown in FIG. 2.

As shown in FIG. 12, a wall structure 18' is formed on a rear surface 14a' of a lamp body 14', and an elastic sealing member 20' is allowed to adhere to the leading end of the wall structure 18'. After the lamp 10' has been joined to a panel 2' of a vehicle body, a sealing effect along the wall structure 18' can, therefore, be maintained. As a result, introduction of water or the like into the lamp 10' can be prevented.

The lamp 10' for a vehicle shown in the foregoing drawing incorporates a wall configuration 18' which is formed to extend as one simple closed curve. Therefore, a great compressive load has to be exerted on the elastic sealing member 20' when the lamp 10' is joined to the panel 2' of the vehicle body. Moreover, the central position of the elastic sealing member 20' may accidentally shift to the right and/or to the left of the wall configuration 18'. If the lamp 10' is joined to the panel 2' of the vehicle body in such a shifted state, the required sealing effect cannot be maintained.

SUMMARY

The present invention provides a lamp for a vehicle incorporating a wall structure formed on the rear surface thereof, and an elastic sealing member allowed to adhere to the leading edge of the wall structure. The wall structure is arranged to minimize the compressive load exerted on the elastic sealing member when the lamp is joined to the panel of a vehicle body, and to prevent shifting of the position of the elastic sealing member with respect to the wall structure.

The present invention achieves the foregoing results by defining the shape of the wall structure. That is, the present invention is based on a precondition that a lamp for a vehicle is provided with a lamp body having a wall structure formed on the rear surface thereof, and an elastic sealing member adhered to the leading edge of the wall structure.

A first aspect of the present invention includes at least a portion of the wall structure that is a multiple wall portion. A second aspect of the invention includes at least a portion of the wall structure having single wall portions, each of which is formed annularly, and ribs that branch out from a plurality of positions of the single wall portions. A third aspect of the present invention includes portions of the wall structure each having a short height and incorporating multiple wall portions, and portions each having a tall height incorporating single wall portions formed annularly, and ribs that branch out from a plurality of positions of the single wall portions.

As far as the "wall structure" is extended to form a closed curve, the shape of the closed curve is not limited. As far as the "elastic sealing member" is the member having elasticity and is applied to adhere to the leading edge of the wall structure, the specific structure including the cross sectional shape, the material and a method of allowing the same to adhere to the leading edge of the wall structure is not limited.

The "multiple wall" according to the first and third aspects of the present invention means a plurality of walls extending in parallel with respect to one another in an annular manner.

Each "rib" according to the second and third aspects of the present invention has a surface of the leading edge which is flush with the surface of the leading edge of the single wall portion, and the specific structure including the direction of extension from the single wall portions and disposition is not limited.

As described above, the first aspect of the present invention has a structure in which at least a portion of the wall structure incorporates multiple walls. Therefore, the foregoing portion structured as described above is able to stably hold the elastic sealing member.

The second aspect of the present invention has a structure in which at least a portion of the wall structure incorporates single walls each of which is formed annularly and includes ribs that branch out from a plurality of positions of the single wall. Therefore, the foregoing portion structured as described above is able to stably hold the elastic sealing member by the single wall portions and the plurality of ribs.

Therefore, the portion according to the first aspect of the invention and constituted by the multiple walls and the portion according to the second aspect of the invention and constituted by the single walls and a plurality of ribs are able to maintain a predetermined sealing effect without the need to apply a great compressive load to the elastic sealing member when the lamp is joined to the panel of a vehicle. Moreover, the position of the elastic sealing member is not easily shifted with respect to the wall structure. In addition, the required sealing effect can easily be maintained. Furthermore, employment of the foregoing structure enhances the strength of the wall structure.

When a comparison is made between a configuration in which the wall structure is constituted by the multiple walls and a structure in which the same is constituted by the single walls and aplurality of ribs, the former structure is able to more stably hold the elastic sealing member. If the height of the wall structure is enlarged, the wall structure cannot easily be constituted by the multiple walls from a viewpoint of moldability of the lamp body.

In another aspect, a portion of the wall structure having a short height incorporates multiple walls, and a portion having a tall height incorporates single wall portions formed annularly and having ribs that branch out from a plurality of positions of the single wall portions. As a result, the elastic sealing member can satisfactorily stably be held without detracting from the moldability of the lamp body.

The direction in which each rib extends from the single wall portions is not limited in the second and third aspects of the present invention, as described above. It is preferable that each of the ribs is formed to extend in a direction in which downward flow of water along the rear surface of the lamp body is not inhibited by the ribs from the viewpoint of obtaining a satisfactory sealing effect between the lamp and the panel of the vehicle body.

In the present invention, the cross sectional shape of the elastic sealing member is not limited as described above. In one implementation, the elastic sealing member has a two-ridge cross sectional shape. Thus, the sealing effect between the lamp and the panel of the vehicle body can be further improved as compared with a single ridge structure. The "two-ridge" shape means a shape having a pair of projections formed substantially symmetrically with each other.

In the present invention, the material of the elastic sealing member and the method of allowing the same to adhere to the leading edge of the wall structure are not limited as described above. In an implementation, the elastic sealing member is made of thermosetting resin foam adhered to the leading edge of the wall structure by a transferring process using a transferring jig. In this case, the yield of the elastic sealing member can be significantly improved as compared with a conventional method of bonding a sheet packing material or the like molded into an annular shape to the leading edge of the wall structure. Moreover, the adhering operation can considerably be simplified. As a result, the cost of the lamp can be reduced. Referring to the drawings, an embodiment of the present invention will be described hereinafter.

BRIEF DESCRIPTION OF THE DRAWINGS

FIGS. 4(a) and 4(b) are cross sectional views showing a state in which an elastic sealing member according to the invention is allowed to adhere to the leading edge of the wall structure, in which FIG. 4(a) shows a portion composed of a double wall configuration and FIG. 4(b) shows a portion composed of a single wall configuration and a plurality of ribs.

FIG. 10(a) is a cross sectional view showing a portion of another implementation of a wall structure according to the invention and 10(b) is a rear view.

FIG. 11(a) is a cross sectional view showing a portion of another implementation of the wall structure according to the invention and 11(b) is a rear view.

DETAILED DESCRIPTION

Figure 1:
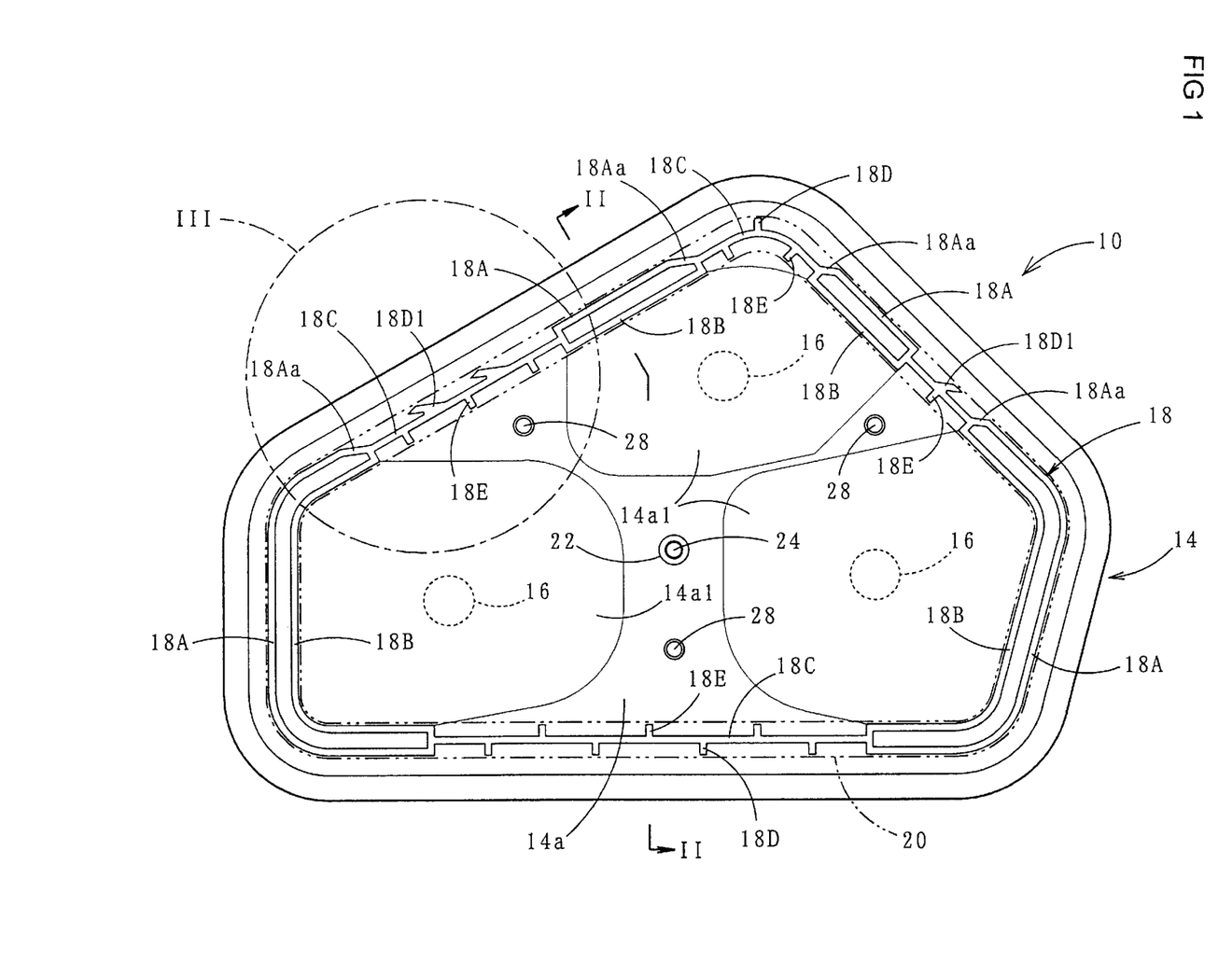
FIG. 1 is a rear view showing a lamp for a vehicle according to an embodiment of the present invention.
Figure 2:
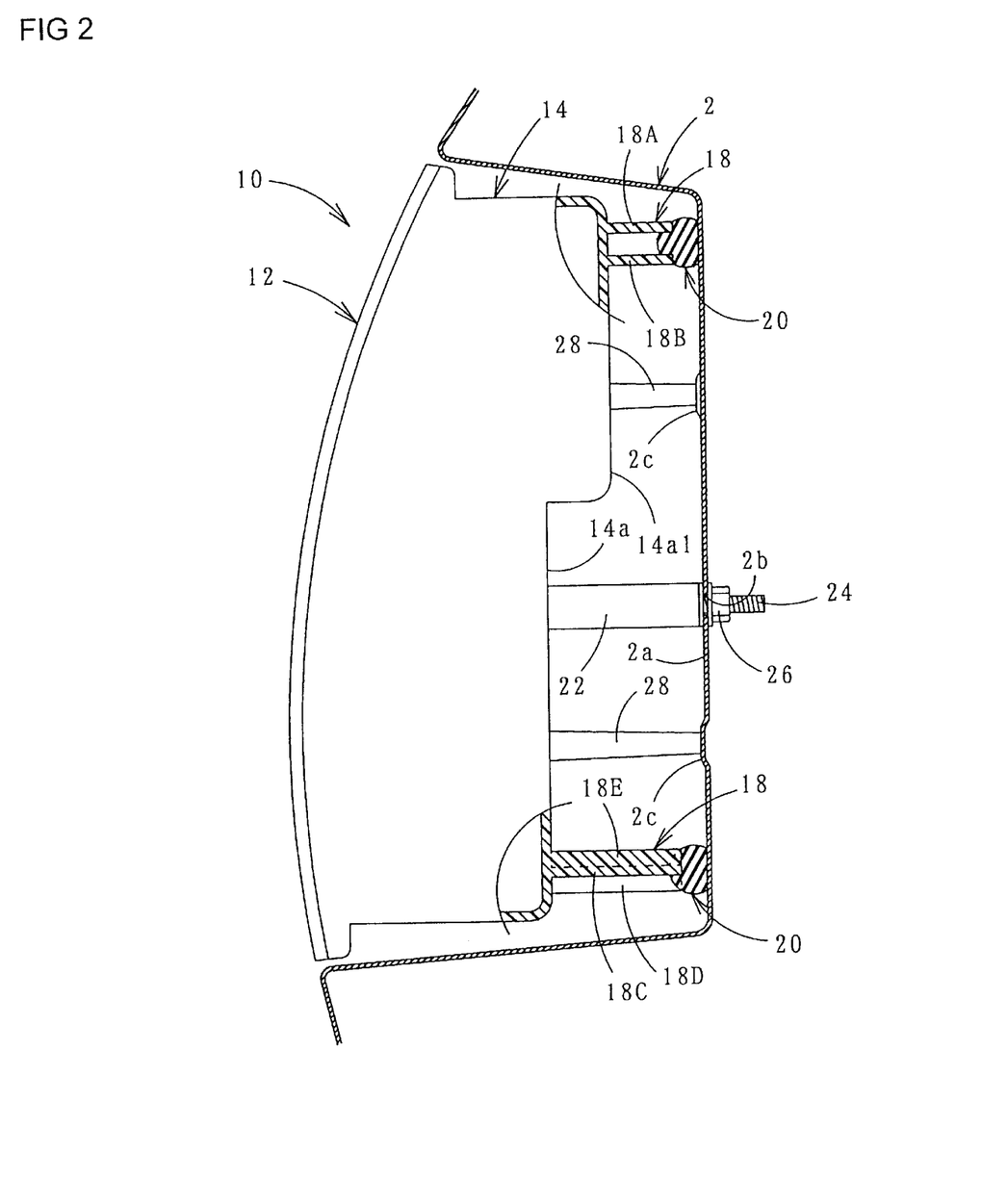
FIG. 2 is a cross sectional view taken along line II—II shown in FIG. 1.

FIG. 1 is a rear view of a lamp for a vehicle according to an embodiment of the present invention. FIG. 2 is a cross sectional view taken along line II—II.

As shown in the drawings, a lamp 10 for a vehicle according to this embodiment is a rear combination lamp for an automobile which incorporates a plurality of lamp chambers each of which is composed of a front lens 12 and a lamp body 14 and provided with light-source bulb 16.

A portion of a rear surface 14a of the lamp body 14 which includes a rear portion of each lamp chamber is formed into an expanded portion 14a1 which projects rearward (hereinafter a rear portion of the lamp, which is designed to fit into a front portion of the vehicle body).

The rear surface 14a of the lamp body 14 has a wall structure 18 formed along the outer periphery thereof. Since in this example the rear shape of the lamp body 14 is formed into a substantially pentagonal shape, the shape of the wall structure 18 is a substantially pentagonal closed curve.

An elastic sealing member 20 is applied to adhere to the leading edge of the wall structure 18 over its whole length. When the lamp 10 is joined to the panel 2 of the vehicle body, the wall structure 18 is brought into contact with a lamp mounting surface 2a of the panel 2 of the vehicle body through the elastic sealing member 20. A stud bolt 24 disposed at the leading end of a boss 22 formed in substantially the central portion of the rear surface 14a of the lamp body 14 is inserted into a bolt insertion hole 2b formed in the lamp mounting surface 2a. Then, the stud bolt 24 is tightened by a nut 26 such that the lamp 10 for a vehicle is secured to the panel 2 of the vehicle body. Moreover, three bosses 28 are formed at predetermined positions on the rear surface 14a of the lamp body 14 such that the boss 22 is surrounded by the bosses 28. The front surface of each of the bosses 28 is brought into abutment against a boss contact surface 2c projecting over the lamp mounting surface 2a of the panel 2 of the vehicle body. Thus, the bosses 28 stabilize the lamp 10 for a vehicle when it is joined to the panel 2 of the vehicle body. Moreover, a predetermined distance between the front surface of the wall structure 18 and the lamp mounting surface 2a can be maintained.

As described below, the elastic sealing member 20 is made of thermosetting resin foam transferred to the leading edge of the wall structure 18 by using a transferring jig. After the lamp 10 for the vehicle has been joined to the panel 2 of the vehicle body, elastic and compressive deformation of the elastic sealing member 20 in a predetermined amount occurs owning to the contact with the lamp mounting surface 2a. As a result, the space between the lamp 10 for a vehicle and the panel 2 of the vehicle body is effectively sealed along the wall structure 18. Thus, introduction of water, dust or the like can be prevented to protect the portion of the rear surface 14a of the lamp body 14 to which the light-source bulb is joined.

The front surface of the wall structure 18 is formed to be flush along the whole length thereof with regard to the mounting surface. Therefore, the height of the wall structure 18 is shorter in the areas adjacent to each expanded portion 14a1. The height of the wall structure 18 is longer in the other portions. In the section of the wall structure 18 adjacent to the expanded portions 14a1, the wall structure 18 incorporates a pair of walls (double wall sections) 18A and 18B. In the other portions, the wall structure 18 incorporates a single wall section 18C and ribs 18D and 18E that branch out from a plurality of positions along the single wall section 18C toward the outside and inside portions.

Each single wall section 18C is formed to extend from substantially a central portion in relation to the double wall sections 18A and 18B. The ribs 18D and 18E may be formed an equal distance apart from each other. The ribs 18D are formed on the outside and the ribs 18E are formed on the inside portion, and may be positioned substantially opposite to each other in the upper right inclined portion of the wall structure 18. In the implementation shown in FIG. 1, the ribs 18D and 18E are shifted from one another by a half pitch so that a zigzag arrangement is formed.

Figure 3:
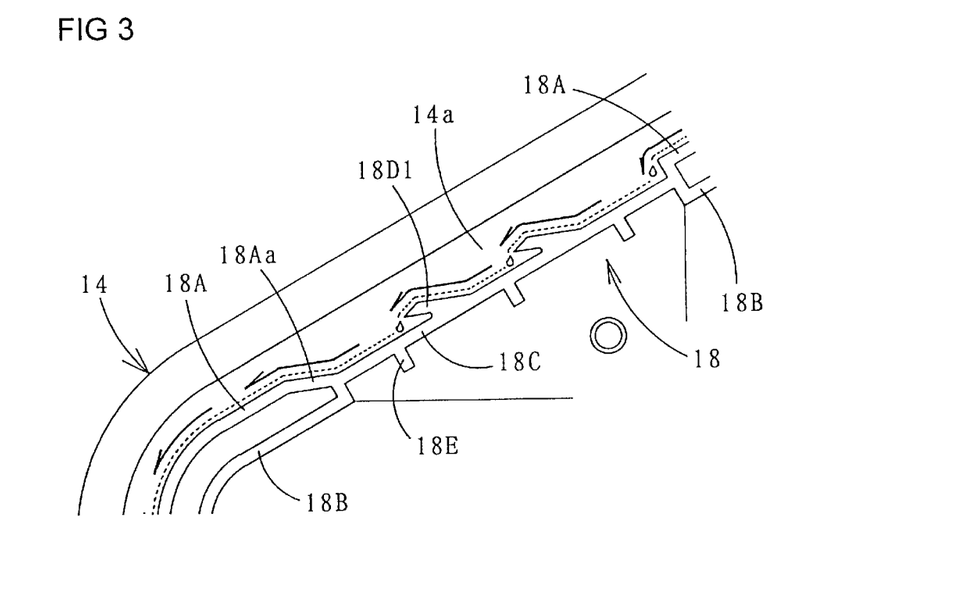
FIG. 3 is a detailed view showing a portion III shown in FIG. 1.

The majority of the ribs 18D and 18E are formed to project substantially perpendicularly from the single wall section 18C. Ribs 18D1 are shown in the upper right inclined portion and the upper left inclined portion of FIG. 1 projecting slightly downwards from the wall structure 18. As a result, as shown in FIG. 3, water flowing along the upper surface of the single wall sections 18C is not trapped by the ribs 18D1. That is, when the automobile lamp is mounted on a vehicle water is permitted to flow on the upper surface of the ribs 18D1.

The edges of the double wall sections 18A and 18B are formed such that upper ends 18Aa of the outer wall 18A in the upper right inclined portion and the upper left inclined portion of the wall structure 18 are inclined downwards and extended diagonally to prevent trapping water which flows along the upper surface of the single wall section 18C.

Figure 4:
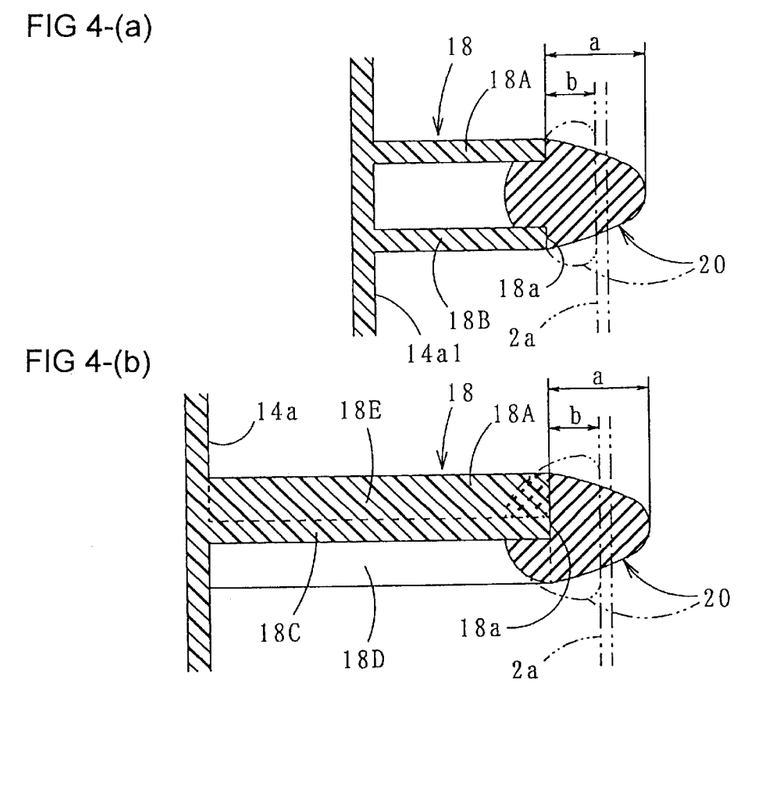

FIG. 4 is a cross sectional view showing a state in which the elastic sealing member 20 is applied to adhere to the leading edge of the wall structure 18. FIG. 4(a) shows a portion including the double wall sections 18A and 18B and FIG. 4(b) shows a portion including the single wall section and ribs 18D and 18E.

As shown in the drawings, the elastic sealing member 20 projects over a front surface 18a of the wall structure 18 to form a semi-elliptical shape. The base portion of the elastic sealing member 20 is, as shown in FIG. 4(a), formed into a substantially circular-arc shape seated between the double wall sections 18A and 18B. The elastic sealing member 20 is, as shown in FIG. 4 (b), formed into a substantially circular-arc shape to contact the single wall section 18C and ribs 18D and 18E from two sides. When the lamp 10 for a vehicle has been joined to the panel 2 of the vehicle body, elastic and compressive deformation of the elastic sealing member 20 occurs such that the elastic sealing member 20 expands along two sides owning to the contact with the lamp mounting surface 2a, as indicated by the alternate long and two short dashed lines in FIGS. 4(a) and 4(b). The compressibility ratio (b/a) is about 40% to about 90%, preferably about 60% to 80%.

Figure 5:
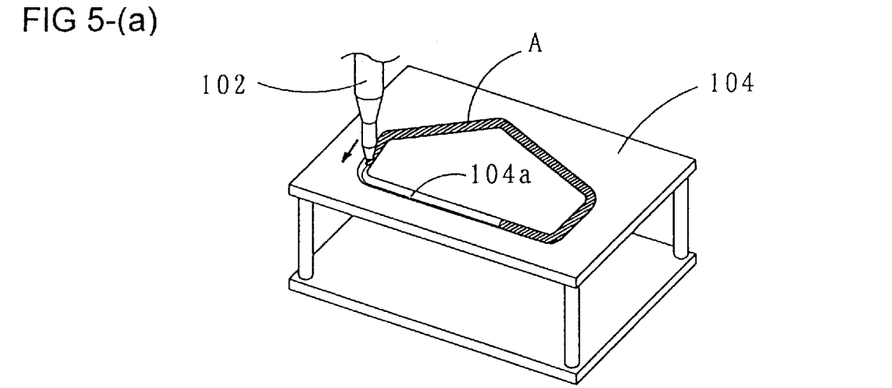
FIGS. 5(a) to 5(c) are diagrams showing a process for allowing the elastic sealing member to adhere to the wall structure.
Figure 6:
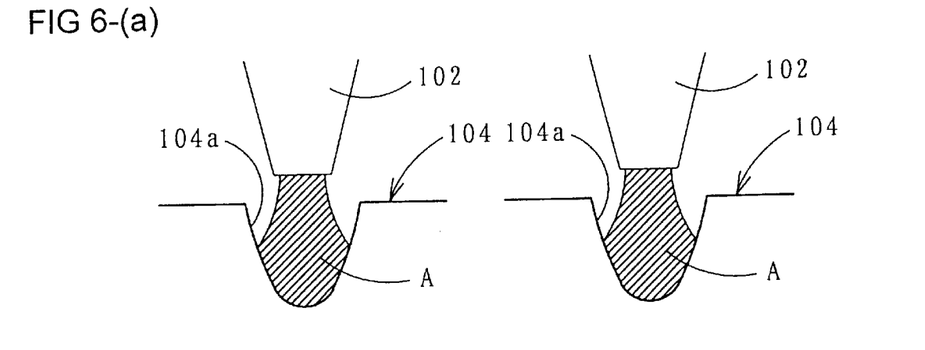
FIGS. 6(a) to 6(c) are detailed cross sectional views illustrating different wall structure portions being adhered to a sealing member.

FIGS. 5(a) to 5(c) are diagrams showing a process of applying the elastic sealing member 20 to adhere to the leading edge of the wall structure 18. FIGS. 6(a) to 6(c) are cross sectional views showing a detailed portion of each process.

As shown in FIGS. 5(a) and 6(a), a nozzle 102 attached to the leading end of a robot arm is moved along the same annular route of the wall structure 18, that is, along a recessed groove 104a provided by a transferring jig 104 and having a substantially semi-elliptical cross sectional shape. Thus, thermosetting resin foam A is applied from the nozzle 102 to the inner surface of the recessed groove 104a.

Then, as shown in FIGS. 5(b) and 6(b), the lamp body 14 is brought into contact with the transferring jig 104 such that the leading edge of the wall structure 18 of the lamp body 14 and the recessed groove 104a are aligned with each other. Thus, the thermosetting resin foam A is, under pressure, brought into contact with the leading edge of the wall structure 18. In the foregoing state, the elements are cooled and allowed to stand for a predetermined time so that the thermosetting resin foam A is transferred to the leading edge of the wall structure 18.

As shown in FIGS. 5(c) and 6(c), the lamp body 14 is removed from the transferring jig 104, and then it is introduced into a high-temperature and high humidity tank for foaming and hardening. As a result, the elastic sealing member 20 is allowed to adhere to the leading edge of the wall structure 18.

Figure 7:
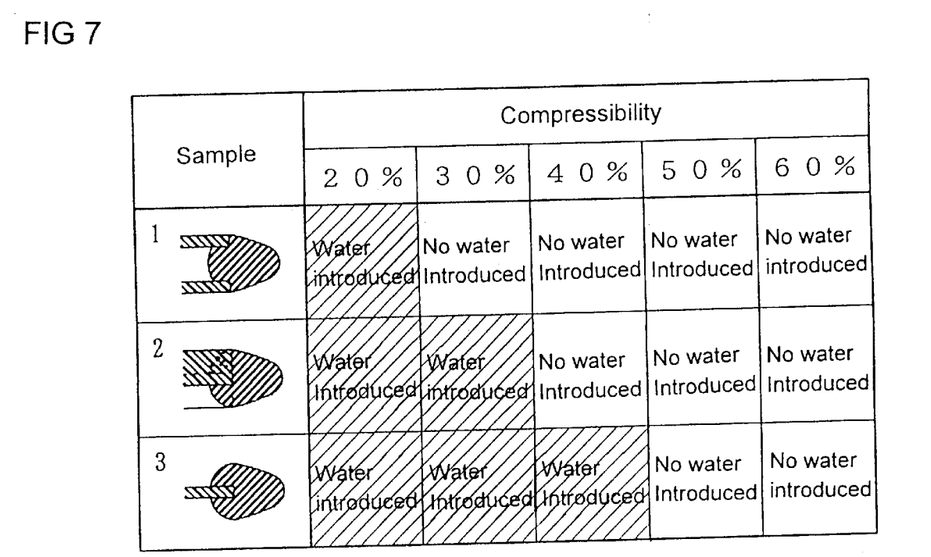
FIG. 7 is a table showing results of a water prevention test performed to compare an embodiment according to the invention with a conventional example.

FIG. 7 is a table showing results of a water prevention test to evaluate the sealing effect of the elastic sealing member which incorporates the wall structure 18 according to this embodiment in comparison to a conventional example.

Referring to FIG. 7, sample 1 included a wall structure incorporating a double wall similar to the double wall sections 18A and 18B, sample 2 was a rib incorporating a single wall and a plurality of ribs similar to the single wall sections 18C and the plurality of ribs 18D and 18E, and sample 3 was a single wall incorporating a single rib similar to the conventional single wall 18' embodiment shown in FIG. 12, which served as the conventional example. Each of the samples 1, 2 and 3 included a projecting elastic sealing member having the same cross sectional shape as that of the elastic sealing member 20.

Each of the samples 1, 2 and 3 was brought into contact with a flat plate to evaluate the water prevention effect in a state where elastic and compressive deformation of the elastic sealing member at the leading edge occurred. The water stopping effect was evaluated such that a state, in which water under a hydraulic pressure of 300 mm was enclosed in either space of the rib, was maintained for 24 hours. Then, whether or not water was introduced from the space between the elastic sealing member and the flat plate into the opposite space was visually confirmed. The compressibility of each of the samples 1, 2 and 3 was set to be five compressibility values which were 20%, 30%, 40%, 50% and 60% to evaluate the water prevention effect.

As a result, as shown in the table, in sample 1, introduction of water was observed when the compressibility ratio was 20%, and it was free from introduction of water when the compressibility ratio was 30% to 60%. In sample 2, introduction of water was observed when the compressibility ratio was 20% and 30%, and was free from introduction of water when the compressibility ratio was 40% to 60%. In sample 3, introduction of water was observed when the compressibility ratio was 20% to 40%, and was free from introduction of water when the compressibility ratio was 50% to 60%.

As can be understood from the results of the test, samples 1 and 2 have superior water prevention properties with regard to that of sample 3. One reason for this may be that samples 1 and 2 were able to hold the elastic sealing member more stably than sample 3. But sample 1 has superior water prevention effect to that of the sample 2. The reason for this may be that sample 1 is able to hold the elastic sealing member more stably than sample 2.

As can be understood from the results of the test, the structure of this embodiment incorporating the wall structure 18 which includes double wall sections 18A and 18B, the single wall sections 18C and a plurality of ribs 18D and 18E has the following effect. That is, the sealing effect between the lamp 10 for a vehicle and the panel 2 of the vehicle body can furthermore satisfactorily be maintained as compared with the wall 18' which is a single wall even if the compressibility of the elastic sealing member 20 is low. The portions of the wall structure 18 composed of the double walls 18A and 18B and the portions including single wall portions 18C and a plurality of ribs 18D and 18E are compared with one another. The latter portions are able to maintain the sealing effect at the lower compressibility.

As described above, this embodiment has a structure in which the wall structure 18 formed on the rear surface 14a of the lamp body 14 is composed of the portions incorporating the double wall sections 18A and 18B and the portions incorporating the single wall sections 18C and the plural ribs 18D and 18E. Therefore, the elastic sealing member 20 can stably be held along the whole length of the wall structure 18.

Therefore, when the lamp 10 for a vehicle is joined to the panel 2 of the vehicle body, exertion of a great compressive load on the elastic sealing member 20 is not required to maintain the required sealing effect. Since undesirable shifting of the elastic sealing member 20 with respect to the wall structure 18 hardly ever occurs, the required sealing effect can easily be maintained from the foregoing viewpoint. When the above-mentioned structure is employed, the strength of the wall structure 18 can be enhanced.

Moreover, the wall structure 18 according to this implementation is structured such that all of the portions (portions adjacent to the expanded portion 14a1 of the rear surface 14a of the lamp body 14) in each of which the height of the wall is low are composed of the double wall portions 18A and 18B having the excellent sealing effect. Only the other portions (portions which cannot easily be composed of the double walls 18A and 18B because of the moldability of the lamp body 14) in each of which the height of the wall is high are composed of the single wall portions 18C and the plural ribs 18D and 18E. Therefore, the elastic sealing member 20 can satisfactorily and stably be maintained without detracting from the moldability of the lamp body 14.

The wall structure 18 according to this embodiment is formed such that downward flow of water along the rear surface 14a of the lamp body 14 is not inhibited. That is, water is allowed to flow downwards. Therefore, an adverse influence of trapped water which may be exerted to the sealing effect between the lamp 10 for a vehicle and the panel 2 of the vehicle body can be prevented.

In this embodiment, the elastic sealing member 20 is made of thermosetting resin foam transferred to the leading end of the wall structure 18 by using a transferring jig 104. In comparison to a structure in which a sheet packing material is molded into an annular shape and then bonded to the leading end of a wall structure, the yield of the elastic sealing member can significantly be improved. Moreover, the adhering process can be simplified considerably. As a result, the cost of the lamp can be reduced.

The foregoing embodiment is structured to accept an elastic sealing member 20 which has a semi-elliptical cross sectional shape. As an alternative to the elastic sealing member 20 having a single ridge cross sectional shape, an elastic sealing member having a two-ridge cross sectional shape may be employed.

Figure 8:
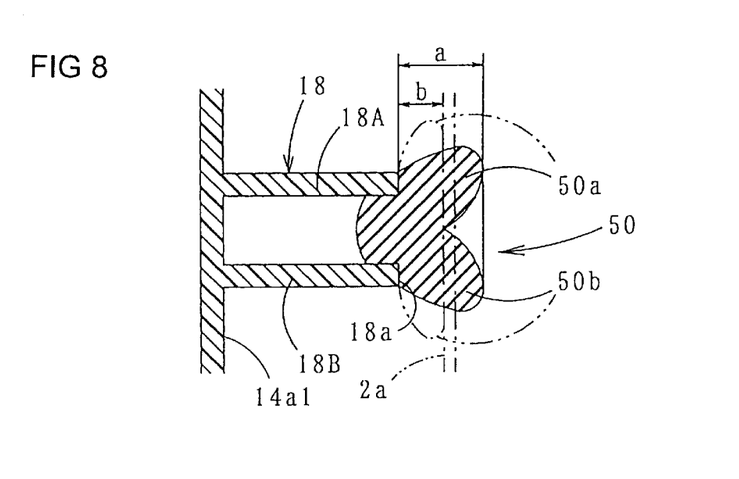
FIG. 8 is a cross sectional view showing a portion of a modified elastic sealing member adhered to a wall structure according to the invention.

FIG. 8 is a cross sectional view showing a state in which a two-ridge shape elastic sealing member 50 incorporating a pair of semi-elliptical projections 50a and 50b defining a predetermined angle is allowed to adhere to the leading edge of the wall structure 18.

As shown in FIG. 8, the projections 50a and 50b of the elastic sealing member 50 are easily expanded to the two opposite sides as indicated with alternate long and two short dashed lines owning to the contact with the lamp mounting surface 2a after the lamp 10 for vehicle has been joined to the panel 2 of the vehicle body. If the compressibility ratio (b/a) is the same as that of the elastic sealing member 20 according to the foregoing embodiment and having a single ridge shape, the sealing effect between the lamp 10 for a vehicle and the panel 2 of the vehicle body can be further improved.

As an alternative to the elastic sealing members 20 and 50, any one of a plurality of elastic sealing members having a variety of cross sectional shapes may be employed. For example, an elastic sealing member as shown in FIGS. 9(a) to 9(f) may be employed.

Figure 9:
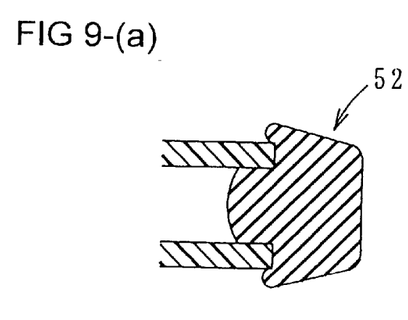
FIGS. 9(a) to 9(f) are cross sectional views showing a portion of a wall structure according to the invention and a variety of modified elastic sealing members.

An elastic sealing member 52 shown in FIG. 9(a) is one of a plurality of single-ridge elastic sealing members and has a substantially trapezoidal cross sectional shape. As compared with the elastic sealing member 20, the elastic sealing member 52 requires a larger compressive load to obtain the same compressibility. However, an advantage can be realized in that the contact between the panel 2 of the vehicle body and the lamp mounting surface 2a can be stably made because the sealing member 52 has a flat face for contacting the surface 2a.

Elastic sealing members 54, 56, 58, 60 and 62 shown in FIGS. 9(b), 9(c), 9(d), 9(e) and 9(f) are examples of two-ridge elastic sealing members. Therefore, similar characteristics to those discussed above concerning the elastic sealing member 50 can be obtained. Since the cross sectional shapes of the foregoing various elastic sealing members are different from one another, the characteristics are, of course, different from one another.

In the foregoing embodiment, the wall structure 18 has portions composed of the double walls 18A and 18B and portions composed of the single walls 18C and a plurality of ribs 18D and 18E. The entire length of the wall structure 18 may be constituted by either of the double wall portions 18A and 18B or single wall portions 18C and a plurality of ribs 18D and 18E. Also in the foregoing cases, the elastic sealing member 20 can stably be held along the whole length of the wall structure 18.

In another implementation, the wall structure 18 may be constituted such that the portions composed of the double walls 18A and 18B are formed by triple walls or include more ribs.

Figure 10:
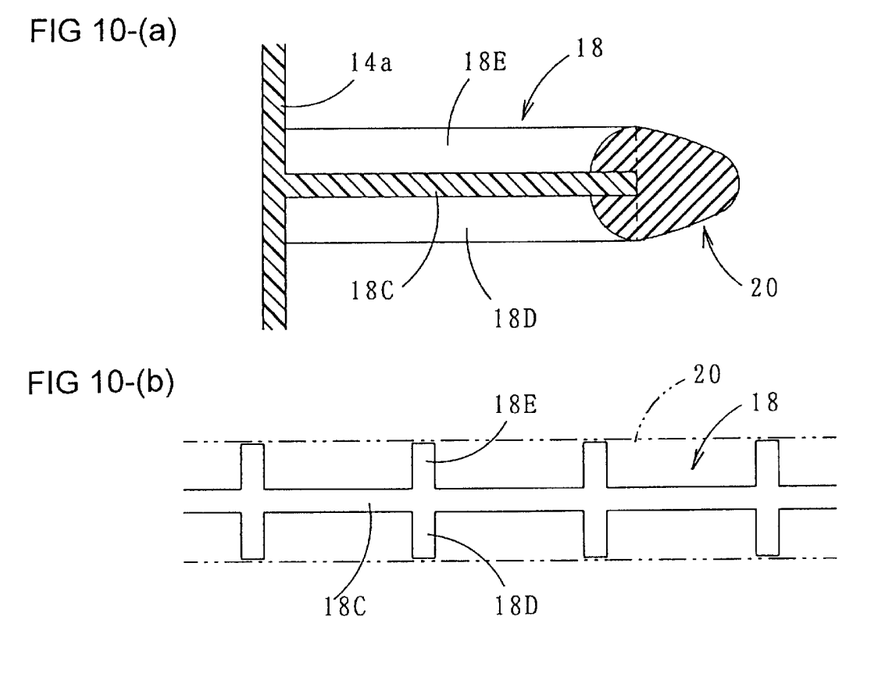

In the foregoing embodiment, the outer ribs 18D and the inner ribs 18E are shifted by a half pitch in a major portion of the single wall portions 18C so that the zigzag arrangement is realized. As shown in FIGS. 10(a) and 10(b), the outer ribs 18D and the inner ribs 18E may be formed directly opposite to one another along the single wall 18C. Also in this case, the elastic sealing member 20 can stably be held.

Figure 11:
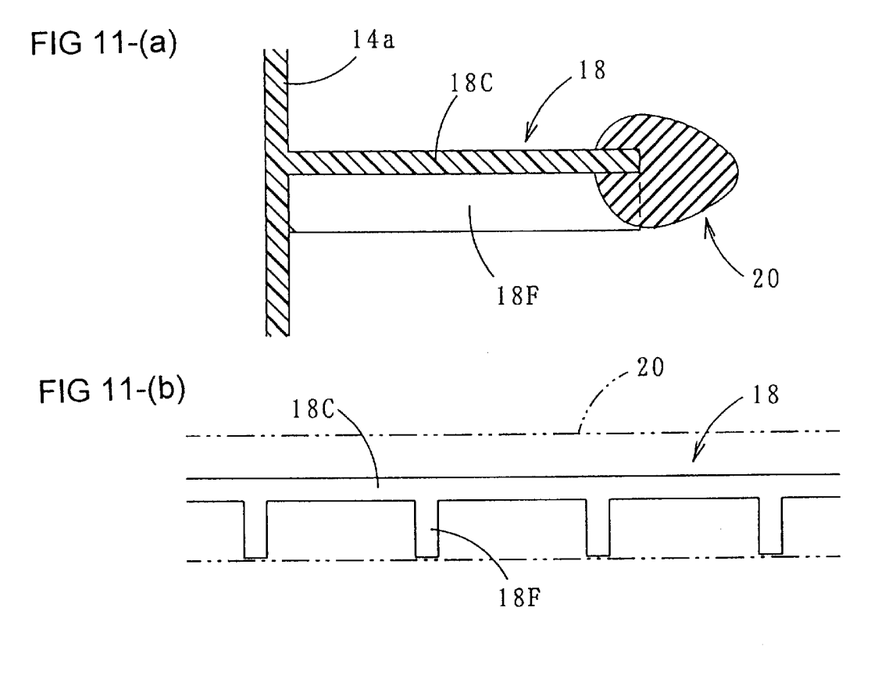

In the foregoing implementations, each of the single wall portions 18C extend from substantially a center area as compared to each of the double walls 18A and 18B (that is, at substantially the center of the elastic sealing member 20). As shown in FIG. 11, a structure may be employed in which each of the single wall portions 18C are slightly offset from the foregoing center area. Moreover, the ribs 18F are formed only on one side (for example, the outer periphery when the single wall portions 18C are offset to the inner periphery as illustrated). Also in the foregoing case, the elastic sealing member 20 can stably be held.

In the foregoing embodiment, the elastic sealing member 20 is made of thermosetting resin foam transferred to the leading end of the wall structure 18 by using a transferring jig 104. An annular sheet packing material or the like having a similar cross sectional shape as that of the elastic sealing member 20 may be bonded to the leading edge of the wall structure 18. The foregoing structure is disadvantageous as compared with the structure according to previously described implementations from viewpoints of the yield of the elastic sealing member and the workability in the adhering process. However, similar operations and effects to those obtainable from the foregoing implementations can be obtained except for drawbacks concerning sheet packing materials and the like.

Although the lamp 10 for a vehicle according to the foregoing implementation is a rear combination lamp for an automobile, other lamp types for vehicles having a structure similar to that according to the described embodiments are able to realize similar operations and effects to those obtainable from the foregoing embodiments.

What is claimed is:

1. A vehicle lamp, comprising:
   a lamp body;
   a light source bulb;
   a wall structure formed on a rear surface of the lamp body;
   an elastic sealing member applied to a leading edge of the wall structure;
   wherein at least a portion of the wall structure incorporates a multiple wall portion.

2. A vehicle lamp, comprising:
   a lamp body;
   light source bulb;
   a wall structure formed on a rear surface of the lamp body;
   an elastic sealing member applied to a leading edge of the wall structure;
   wherein at least a portion of the wall structure incorporates a single wall portion formed annularly that includes ribs branching out from a plurality of positions.

3. A vehicle lamp, comprising:
   a lamp body;
   a light source bulb;
   a wall structure formed on a rear surface of the lamp body;
   an elastic sealing member applied to a leading edge of the wall structure;
   wherein portions of the wall structure are short and incorporate multiple walls, and portions each having a tall height incorporate single walls formed annularly and include ribs that branch outwardly from a plurality of positions along the single wall portion.

4. The lamp of claim 2, wherein each rib is formed to extend in a direction in which the downward flow of water along the rear surface of the lamp body is not inhibited.

5. The lamp of claim 3, wherein each rib is formed to extend in a direction in which the downward flow of water along the rear surface of the lamp body is not inhibited.

6. The lamp of claim 1, wherein the elastic sealing member has a two-ridge cross sectional shape.

7. The lamp of claim 3, wherein the elastic sealing member has a two-ridge cross sectional shape.

8. The lamp of claim 1, wherein the elastic sealing member is made of thermosetting resin foam adhered to the leading edge of the wall structure by a transferring process.

9. The lamp of claim 2, wherein the elastic sealing member is made of thermosetting resin foam adhered to the leading edge of the wall structure by a transferring process.

10. The lamp of claim 3, wherein the elastic sealing member is made of thermosetting resin foam adhered to the leading edge of the wall structure by a transferring process.

11. The lamp of claim 1, further comprising a central boss positioned substantially in the center of the rear surface; and
    a stud bolt disposed at the leading end of the central boss for inserting into a bolt insertion hole of a lamp mounting surface of a vehicle body.

12. The lamp of claim 1, further comprising a plurality of bosses attached to the rear surface in a plurality of positions to stabilize the vehicle lamp when attached to a lamp mounting surface of a vehicle body.

13. The lamp of claim 2, further comprising:
    a central boss positioned substantially in the center of the rear surface; and
    a stud bolt disposed at the leading end of the central boss for inserting into a bolt insertion hole of a lamp mounting surface of a vehicle body.

14. The lamp of claim 2, further comprising a plurality of bosses attached to the rear surface in a plurality of positions to stabilize the vehicle lamp when attached to a lamp mounting surface of a vehicle body.

15. The lamp of claim 3, further comprising:
    a central boss positioned substantially in the center of the rear surface; and
    a stud bolt disposed at the leading end of the central boss for inserting into a bolt insertion hole of a lamp mounting surface of a vehicle body.

16. The lamp of claim 3, further comprising a plurality of bosses attached to the rear surface in a plurality of positions to stabilize the vehicle lamp when attached to a lamp mounting surface of a vehicle body.

* * * * *